Aug. 2, 1949.   J. BRISKIN ET AL   2,477,958
MAGAZINE SHUTTER OPERATING MEANS FOR CAMERAS
Filed Dec. 22, 1947   3 Sheets-Sheet 1

Inventors:
Jack Briskin
Joseph J. Golick
By: Zabel and Fitzbaugh
Attys.

Aug. 2, 1949.  J. BRISKIN ET AL  2,477,958
MAGAZINE SHUTTER OPERATING MEANS FOR CAMERAS
Filed Dec. 22, 1947  3 Sheets-Sheet 2
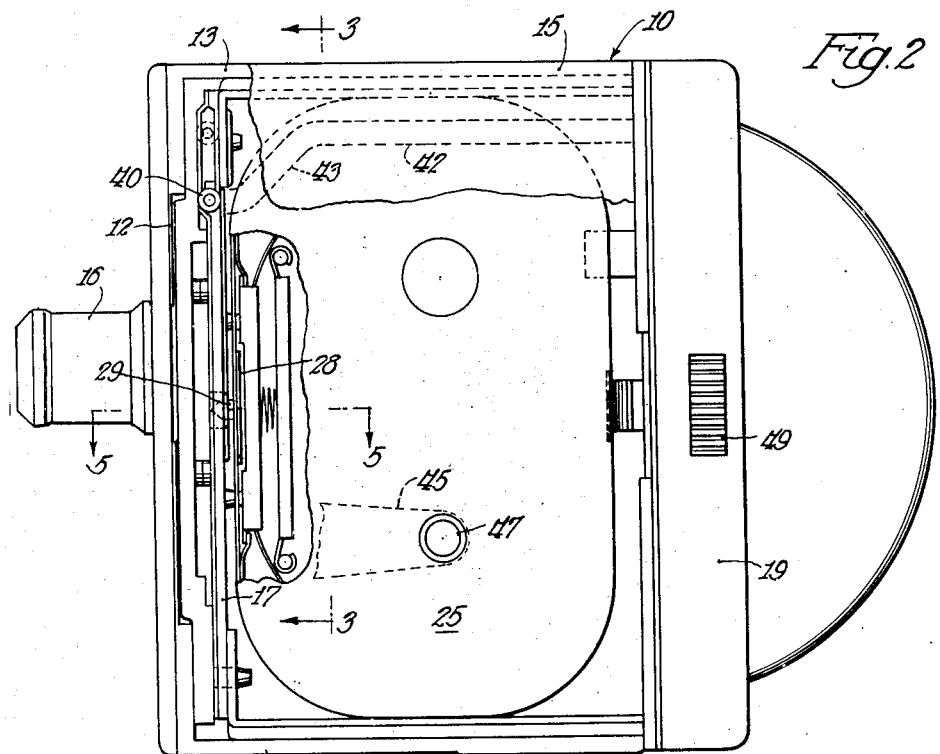
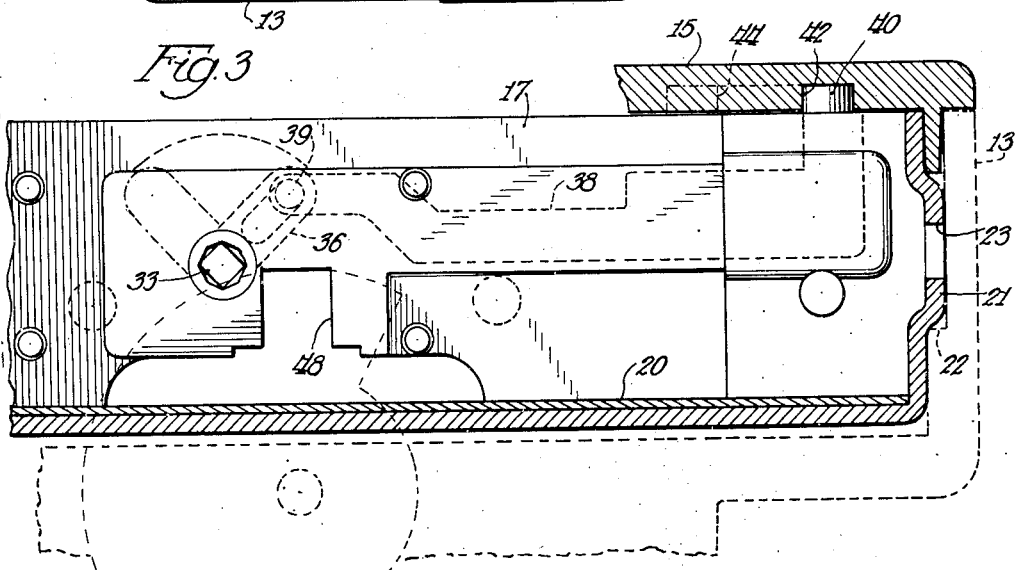
Inventors.
Jack Briskin
Joseph J. Golick
By: Zabel and Fitzbaugh Attys.

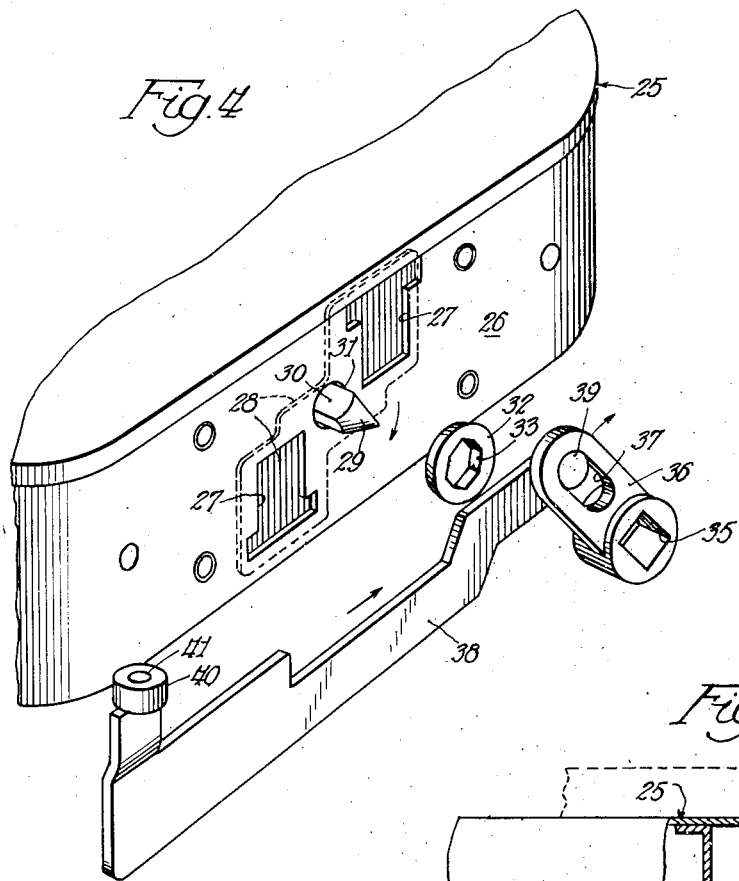
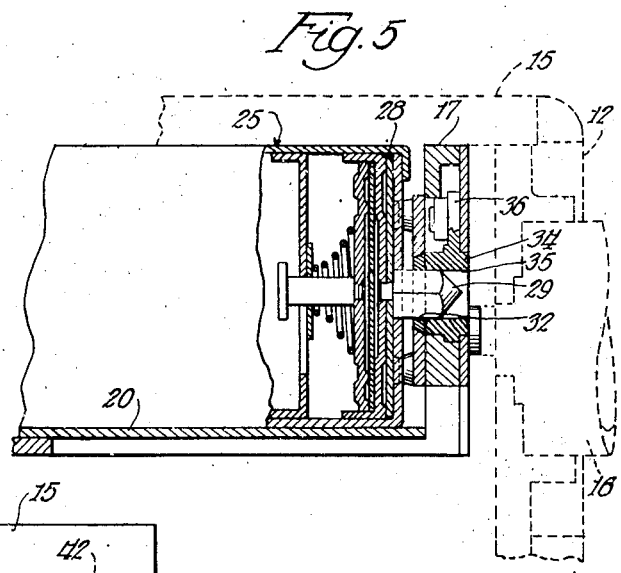
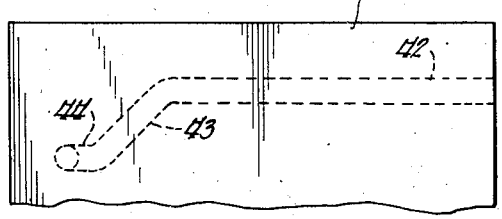

Patented Aug. 2, 1949

2,477,958

UNITED STATES PATENT OFFICE 2,477,958

MAGAZINE SHUTTER OPERATING MEANS
FOR CAMERAS

Jack Briskin and Joseph J. Golick, Chicago, Ill.,
assignors to Revere Camera Company, Chicago,
Ill., a corporation of Delaware Application December 22, 1947, Serial No. 793,128

4 Claims. (Cl. 88—17)

The present invention relates to motion picture cameras and particularly to those of the magazine type: i. e., of the type wherein the film is enclosed within a light-tight magazine that is insertable into a chamber in the camera body or case. When the magazine is fully loaded in the chamber it is housed in a light-tight compartment. The film magazine is provided with a window opening that is disposed in alignment with the optical axis of the camera lens when the magazine is properly positioned in the camera case so that when the camera is operated the film directly behind the window opening in the magazine is properly aligned with respect to the camera lens so that upon opening and closing of the camera shutter proper exposures of the film are made. These exposures, of course, result from the opening and closing of the camera shutter to permit light to pass through the camera lens and then through the window opening in the film magazine to expose an image on that portion of the film contained in the magazine and disposed directly behind the magazine window opening. Thus it is one object of the present invention to provide a centering device that insures accurate centering of the magazine with respect to the optical axis of the camera lens when the magazine is disposed in the camera case.

The window opening in the magazine is normally closed by a light-tight shutter to prevent exposure of the film at times when the magazine is outside the camera case and during the period when the magazine is being loaded into the camera case. Before the film in the magazine can be exposed by operation of the camera it is necessary to open this magazine shutter so as to place the film in condition to be exposed during opening and closing of the camera shutter. The opening of the magazine shutter, however, must be properly timed during the loading of the film magazine into the camera case so as not to permit the magazine shutter to open until the magazine is disposed in the light-tight chamber in the camera case, for otherwise the film would become light struck while the film is being loaded into the camera. Thus ideally the magazine should be enclosed in the light-tight case and properly centered with respect to the optical axis of the camera lens before the magazine shutter is opened. By centering the magazine prior to opening the shutter it is possible to insure against the possibility of inadvertently exposing the film because otherwise subsequent shifting of the magazine in the camera case to center the magazine may allow light to leak past the magazine and expose the film.

The present invention provides for first centering the magazine and then finally opening the magazine shutter so as to insure against the possibility of exposing the film during the camera loading operation. This is all done automatically as the magazine is being inserted into the camera case.

In the specific embodiment of the invention to be disclosed herein the camera is provided with a drawer that is adapted to slide in and out of the camera case. This drawer serves as the receptacle for receiving the film magazine and when the drawer is in its open position the magazine is simply laid into the drawer with the forward wall of the magazine containing the window opening disposed against the forward wall of the drawer. As the magazine is being placed in the drawer it is first automatically centered with respect to the optical axis of the lens and then it engages mechanism that subsequently serves to open the magazine shutter. The drawer is then moved to its closed position in the camera case and during the final operation of travel of the drawer to closed position, the shutter opening mechanism is actuated automatically to open the magazine shutter. The camera is then ready to be operated and as yet no light has been allowed to come in contact with the film. Thus during the entire loading operation the film is protected against the possibility of being light struck.

In the camera forming the subject matter of the present invention the centering of the magazine with respect to the optical axis of the lens is accomplished entirely independently of the magazine shutter operation. Thus before the magazine engages the shutter opening mechanism it is properly centered so that no damage to the magazine or the shutter opening mechanism can result from rough handling of the magazine while it is being loaded into the drawer.

All of the foregoing constitute objects and advantages of the present invention, others of which will become apparent from the following description and the drawings, in which Fig. 1 is an exploded perspective view of a camera embodying the present invention with the camera drawer in open position and a film magazine in condition to be loaded into the camera drawer;

Fig. 2 is a top plan view of a camera with a portion of the top of the camera broken away to illustrate the magazine disposed inside the camera case, and with a portion of the magazine broken away to illustrate the film and film gate;

Fig. 3 is an enlarged, transverse, sectional view taken through the camera, the view being taken along the line 3—3 of Fig. 2;

Fig. 4 is a fragmentary, exploded, perspective view of a film magazine together with the centering and rotating mechanism that is to be carried by the drawer case;

Fig. 5 is an enlarged, vertical, sectional view taken through a portion of the camera, the view being taken along the line 5—5 of Fig. 2; and Fig. 6 is a more or less diagrammatic view illustrating the camera cover with the cam track therein.

Figure 1:
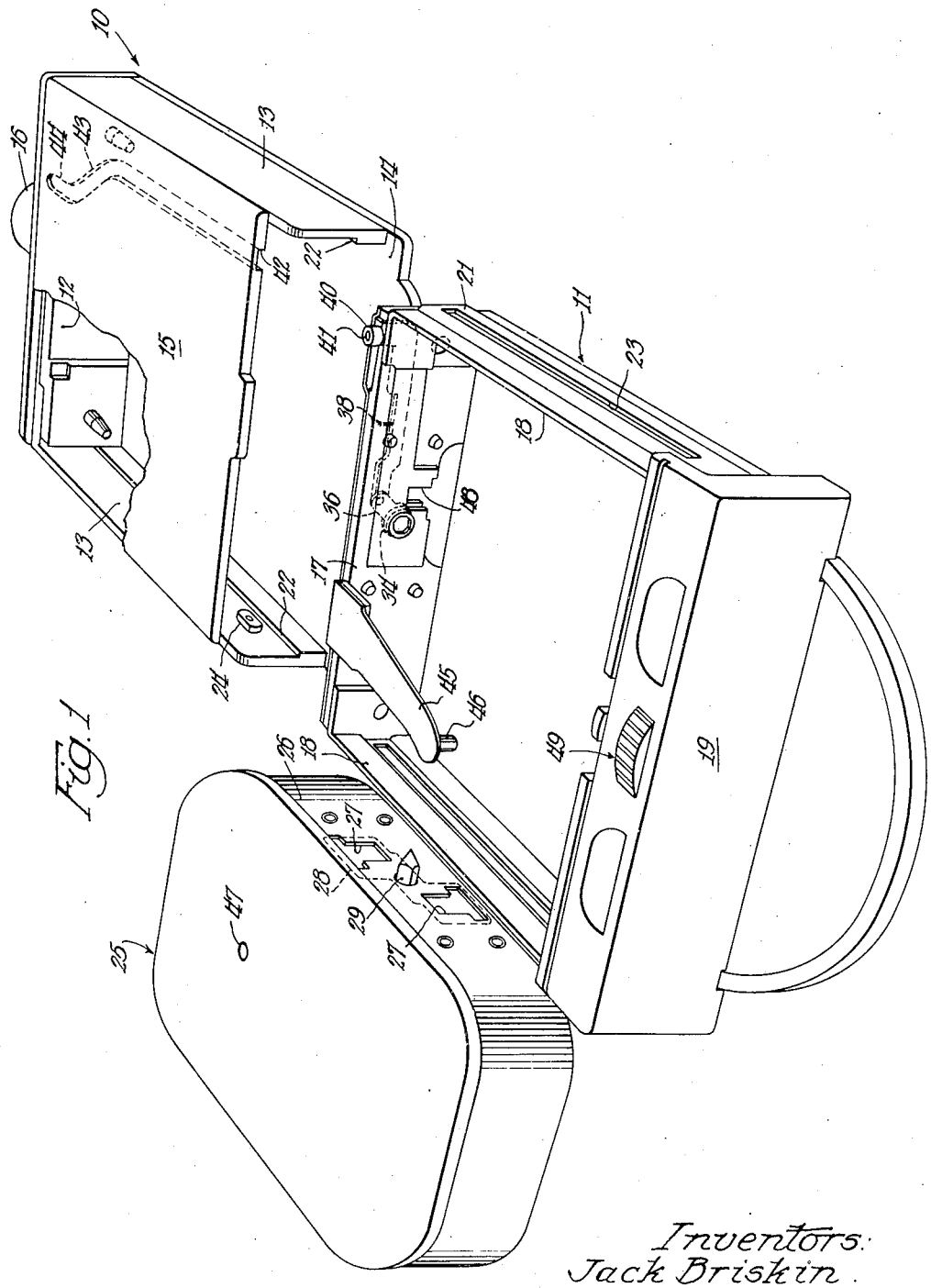

For purposes of illustration a single embodiment only of the present invention will be described hereinafter, it being recognized, however, that many modifications may be made in the particular form of the invention without departing from the intended scope of the invention.

Referring now to Fig. 1 the present invention is illustrated in conjunction with a camera comprising a camera case 10 that is adapted to house a slidable drawer generally indicated at 11. The case 10 encloses a front wall 12, a pair of side walls 13, a bottom wall 14 and an upper wall 15. A lens piece 16 is mounted on the front wall 12 of the camera.

The drawer 11 comprises a front wall 17, a pair of side walls 18, a rear wall 19 and a bottom wall 20. The side walls 18 are provided with track members 21 that are adapted to ride on shoulders 22 on the inner face of the side wall 13 of the camera case 10. Thus the drawer 11 is adapted to move in and out of the camera case 10 riding with the track members 21 on the shoulders 22. A guide track 23 is provided in each of the track members 21 and guide lugs 24 on the inner face of each of walls 13 ride in the guide tracks 23.

The drawer 11 is adapted to receive a film magazine 25. This magazine 25 includes a front wall 26 that is provided with a pair of window openings 27. The window openings 27 are adapted to be closed by a movable shutter 28 that is mounted at its center on the inner end of a pin 29 (see Fig. 5) that is rotatably mounted on the front wall 26 of the magazine. This pin 29 projects through the front wall and is square in cross section on its projecting portion so as to provide flat side surfaces 30 that form right angle edges 31. As shown in Figs. 1 and 4 the magazine shutter 28 is in its closed position covering the window openings 27 but upon rotation of the pin 29 in a clockwise direction the shutter 28 is rotated so as to uncover both of the window openings 27.

Rotatably mounted in the front wall 17 of the drawer 11 as best shown in Figs. 1, 4 and 5 is a centering bushing 32 that is provided with an octagonal opening 33 passing therethrough. Independently mounted in the wall 17 is a rotating bushing 34 that is axially aligned with the bushing 32 and is provided with a square opening 35 passing therethrough. The bushing 34 has an integral crank arm 36 extending therefrom and this arm is provided with an elongated slot or aperture 37. Again referring to Figs. 1 and 4 the front wall 17 of the drawer 11 is further provided with a horizontally slidable arm 38 that is pivotally mounted as at 39 to the apertured end of the crank arm 36 of bushing 34 and at the other end is provided with an upstanding cam member 40. This cam member 40 is in fact a roller mounted on a shaft 41 that is provided at the uppermost end of the slidable arm 38.

The arm 38 is adapted to slide back and forth along the front wall 17 of the drawer 11 and when so doing it moves the crank 36 so as to rotate the bushing 34. The upper wall 15 of the camera case 10 is provided with an elongated slot or track 42 which extends from the rearwardmost edge of the upper wall 15 in a straight line towards the forward wall 12 and then bends inwardly as at 43 towards the central longitudinal axis of the camera case 15 and then terminates in a portion 44 that again extends substantially parallel with the first mentioned straight portion of the track 42. This track portion 42 is adapted to receive the cam roller 40 when the drawer 11 is mounted in the camera case 10 and when the drawer is in its open position the cam roller 40 is disposed adjacent to the rearmost end of the track 42. As the drawer is moved towards its closed position in the camera case 10 the cam roller 40 moves along the track 42 until it reaches the inturned portion 43 and upon further closing of the drawer 11 the cam roller 40 is caused to move inwardly along the portion 43 of the track so as to cause the slidable arm 38 to move from right to left (see Fig. 1) along the front wall 17 of the drawer 11. This movement of the arm 38 rotates the bushing 34 and when the drawer is in its fully closed position the cam roller 40 is disposed in the portion 44 of the track 42. Upon opening of the drawer this operation is reversed, and the rotation of the bushing 34 is brought about entirely independently of the centering bushing 32.

The film magazine 25 is intended to house the film that is to be exposed in the present camera. The present invention is not concerned with the manner in which the film is arranged in the magazine and, therefore, no details of such arrangement are shown herein.

Initially before the magazine is placed in the camera the magazine shutter 28 is in its closed position to prevent light from entering the magazine through the window openings 27. The magazine is then inserted in the drawer 11 with the pin 29 disposed in the openings 33 and 35 in the centering bushing 32 and the rotating bushing 34 respectively. During operation of inserting the magazine in place the pin first passes into the opening 33 in the centering bushing 32 and the magazine is properly centered with respect to the optical axis of the camera by cooperation between the pin 29 and the centering bushing 32. As the magazine is further inserted into the drawer the pin 29 enters the square opening 35 in the rotating bushing 34 and is thus brought into operative relationship with the mechanism that rotates the bushing 34. It is to be noted that the opening 33 in the centering bushing 32 is octagonal in shape and the pin 29 is pointed so that when the magazine is first inserted in the drawer the pointed pin 29 automatically finds its way into the octagonal opening 33 of the bushing 32. If necessary, the bushing 32 is rotated by the pin 29 during this centering operation and this rotation of the bushing 32 is independent of the operating bushing 34. The magazine is now properly centered with respect to the optical axis of the camera so that no further adjustment with respect to centering of the magazine is necessary during the period when the pin 29 is brought into operating engagement with the rotating bushing 34. A hold-down spring 45 engages the top face of the magazine 25 and urges the magazine downwardly so as to cause it to lie flat in the drawer 11 and a pin 46 on the underneath face of the hold-down spring 45 enters an aperture 47 in the top face of the magazine 25 to help hold the magazine in place.

After the magazine is thus placed in the drawer 11 the drawer is moved to its closed position and during the latter part of the transfer of the drawer while the cam roller 40 is moving through the portion 43 of the track 42 the bushing 44 is rotated as previously described so as to impart rotary motion to the pin 29 to open the shutter 28. Both window openings 27 are thus opened.

The front wall 34 of the drawer is provided with a window opening 48 that is aligned with the optical axis of the camera lens piece 16 and when the magazine is in place in the drawer with the pin 29 disposed in the bushings 32 and 34 one of the window openings 27 is aligned with the window opening 48 of the front wall 17 of the drawer. The drawer can now be locked in its closed position by some suitable locking mechanism generally indicated at 49 and the camera is in condition for use.

After the film in the magazine has been exposed the locking mechanism 49 is moved to its unlocked position and the drawer 11 is opened so that the magazine 25 can be withdrawn. During the opening operation of the drawer the cam roller 40 moving along track 42 rotates the bushing 34 so as to close the magazine shutter 28 so that before the drawer reaches its fully opened position the shutter 28 has been closed. The magazine can then be withdrawn from the drawer and turned over and again inserted in the drawer so as to bring the other magazine window opening 27 in alignment with the window opening 48 in the front wall 17 of the drawer. The drawer is then again closed and locked and the camera is again fully loaded for operation to expose the other half of the film in the magazine 25.

The magazine just described is of the double eight millimeter type where one half of the film is exposed throughout its length and then upon inverting the magazine in the drawer the other half of the film is exposed. Obviously the present invention is not intended to be limited to this type of film magazine nor is it intended to be limited to a drawer type of camera. The important feature of the present invention is the fact that the centering bushing 32 is separate and independent from the rotating bushing 34 so that the magazine is first centered properly with respect to the optical axis of the camera lens before it is brought into engagement with the magazine rotating mechanism.

We claim:

1. A camera of the magazine type having a lens with an optical axis and adapted to accommodate a film magazine having a shuttered opening therein aligned with the optical axis comprising a camera case, a drawer slidable in and out of the camera case, magazine shutter operating mechanism mounted on a drawer wall including a magazine engaging member mounted to rotate about a horizontal axis, and an independent magazine centering device mounted on the same drawer wall and rotatable independently of the shutter operating mechanism about the aforementioned axis.

2. A camera of the magazine type having a lens with an optical axis and adapted to accommodate a film magazine having a shuttered opening therein aligned with the optical axis comprising a camera case, a drawer slidable in and out of the camera case, magazine shutter operating mechanism mounted on a drawer wall and including a member rotatable about a horizontal axis, and an independent magazine centering device mounted to rotate freely and independently of the shutter operating mechanism about the same axis.

3. A camera of the magazine type having a lens with an optical axis and adapted to accommodate a film magazine having a shuttered opening therein aligned with the optical axis comprising a camera case, a drawer slidable in and out of the camera case, magazine shutter operating mechanism mounted on a drawer wall and including a member rotatable about a horizontal axis, and an independent magazine centering device mounted to rotate about the same axis, and means on the drawer cooperating with the camera case for rotating the shutter operating mechanism independently of the centering device upon opening and closing the drawer.

4. A camera of the magazine type having a lens with an optical axis and adapted to accommodate a film magazine having a shuttered opening therein aligned with the optical axis comprising a camera case, a drawer slidable in and out of the camera case, magazine shutter operating mechanism mounted on a drawer wall and including a member rotatable about a horizontal axis disposed parallel to the optical axis, an arm mounted on said wall and movable to rotate said member, and cam means on the case adapted to move said arm upon opening and closing the drawer, and an independent magazine centering device mounted to rotate about the same axis but independently of the rotatable member.

JACK BRISKIN.
JOSEPH J. GOLICK.

REFERENCES CITED

The following references are of record in the file of this patent:

UNITED STATES PATENTS

| Number | Name | Date |
| --- | --- | --- |
| 2,262,570 | Wittel | Nov. 11, 1941 |
| 2,347,519 | Sperry | Apr. 25, 1944 |